United States Patent [19]

Burkett et al.

[11] Patent Number: 5,182,439
[45] Date of Patent: Jan. 26, 1993

[54] METHOD AND APPARATUS FOR OPERATING A FOOD OVEN

[75] Inventors: Doug Burkett; Gary L. Mercer, both of Eaton, Ohio

[73] Assignee: Henny Penny Corporation, Eaton, Ohio

[21] Appl. No.: 748,200

[22] Filed: Aug. 19, 1991

[51] Int. Cl.⁵ ............................................. H05B 1/02
[52] U.S. Cl. .................................... 219/412; 219/492
[58] Field of Search ....................... 219/412, 483-486, 219/413, 414, 492

[56] References Cited

U.S. PATENT DOCUMENTS

| | | | |
|---|---|---|---|
| 3,353,004 | 11/1967 | Alexander | 219/405 |
| 3,364,338 | 1/1968 | Holtkamp | 219/412 |
| 3,751,632 | 8/1973 | Kauranen | 219/492 |
| 3,855,452 | 12/1974 | Flasza et al. | 219/486 |
| 4,065,659 | 12/1977 | Yount et al. | 219/413 |
| 4,158,432 | 6/1979 | van Bavel | 219/492 |
| 4,227,062 | 10/1980 | Payne et al. | 219/10.55 B |
| 4,238,669 | 12/1980 | Huntley | 219/413 |
| 4,410,795 | 10/1983 | Ueda | 219/492 |
| 4,467,184 | 8/1984 | Loessel | 219/492 |
| 4,538,049 | 8/1985 | Ryckman, Jr. | 219/386 |
| 4,554,437 | 11/1985 | Wagner et al. | 219/388 |
| 4,575,616 | 3/1986 | Bergendal | 219/405 |
| 4,723,068 | 2/1988 | Kusuda | 219/486 |
| 4,849,597 | 7/1989 | Waigand | 219/492 |
| 4,914,277 | 4/1990 | Guerin et al. | 219/492 |
| 4,918,293 | 4/1990 | McGeorge | 219/492 |
| 4,920,252 | 4/1990 | Yoshino | 219/497 |

Primary Examiner—Geoffrey S. Evans
Attorney, Agent, or Firm—Baker & Botts

[57] ABSTRACT

A method and apparatus for operating a food oven including a base heating element and quartz bulbs. The food oven is operated in a cooking cycle comprised of brown, cook, and finish intervals. The operator of the oven selects the duration of each interval and whether the quartz bulbs should be activated during each interval. The quartz bulbs are automatically activated during any interval in which they are set by the operator. The duration of the interval that the quartz bulbs are activated is adjusted depending on at least one of the oven air temperature, a load compensation factor, and a base temperature set point.

17 Claims, 5 Drawing Sheets

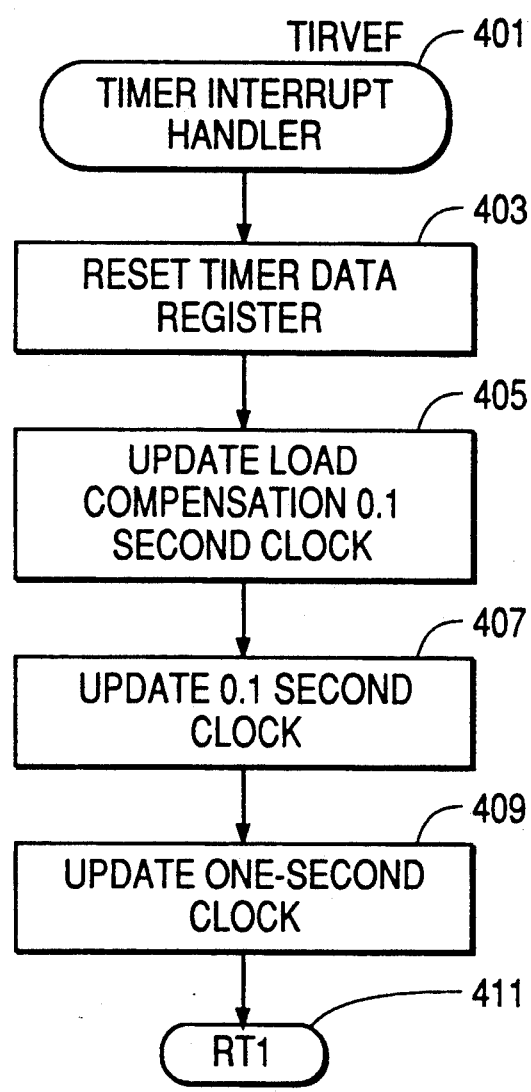

METHOD AND APPARATUS FOR OPERATING A FOOD OVEN

CROSS-REFERENCES TO RELATED APPLICATIONS

This application is related by subject matter to "PREHEATING METHOD AND APPARATUS FOR USE IN A FOOD OVEN", Ser. No. 07/746,760, filed Aug. 19, 1991 and to "PROGRAMMABLE LOAD COMPENSATION METHOD AND APPARATUS FOR USE IN A FOOD OVEN", Ser. No. 07/746,910, filed Aug. 19, 1991, both by the same inventors and filed concurrently herewith.

Source code for the process performed by the present invention in a preferred embodiment is contained with Ser. No. 07/746,910, filed Aug. 19, 1991 in 224 frames on 4 microfiche.

BACKGROUND OF THE INVENTION

1. Field of the Invention

This invention relates generally to the field of food ovens. More specifically, the present invention is directed to a method and apparatus for operating a food oven to automatically control the heating elements to efficiently cook a particular food item.

2. Description of the Relevant Art and Problem

Today, restaurants find it increasingly more desirable to efficiently cook food in order to provide fast service and to reduce the labor costs involved in the cooking process. Efficiency means that a particular food item is cooked in a short time and with minimal interaction required from an operator while not sacrificing food quality.

Many ovens currently in use contain a single heating element. The user must set the oven temperature and monitor the food item to determine when to remove it from the oven. Some ovens contain a timer which turns the heating element on and off to allow a food item to cook for a predetermined time. Other ovens utilize two cooking intervals: a first with conducted heat and a second with both conducted heat and radiant heat.

U.S. Pat. No. 4,238,669 to Huntley, is directed to and entitled, an Oven Having Dual Heating Means. This invention describes a oven having a base plate which is heated. Food items may be placed directly on the heated base plate. A second heating element, preferably a quartz lamp heating element, is placed above the base plate, in the oven's cavity. The quartz heating element has a greater thermal intensity than the base heater. A timer is provided which allows the operator to set the quartz heater to be turned on after a predetermined time, and remain on for a second predetermined time. Thus, the Huntley apparatus contemplates the use of two intervals in a cooking cycle. The intense heat provided by the quartz heater allows, for example, the top of a pizza to be browned quickly.

It is known in the art that a superior product is obtained through the use of a cooking cycle comprising three intervals: a brown, a cook, and a finish interval. For example, conduction, convection, and high intensity radiant heating are each utilized during the brown interval. Following the brown interval, a relatively long cook interval is effected in which only conduction and convection heating are utilized. Finally, during a finish interval, each of conduction, convection, and high intensity radiant heat is applied again. The result is a product which is fully and rapidly cooked with an appetizing color and texture. However, operators of prior art ovens have been required to constantly monitor the cooking process and manually control the timing of the transitions in the cooking sequence in order to insure a quality product. Unless the food item is constantly monitored by the operator, it may become over-cooked because of heat generated by previous cooking cycles. For example, an oven which uses quartz bulbs as well as conducted and convected heat will over-cook pizzas if pizzas are rapidly cooked in sequence without changing the oven settings. Monitoring the cooking process occupies time that the operator may use to attend to other tasks.

SUMMARY OF THE INVENTION

The problems of the prior art are solved by the present invention. The present invention provides a means of programming the oven to vary the on time of a quartz heating element depending upon the type of food item to be cooked. Furthermore, the present invention allows the oven to automatically adjust the quartz heating element on time depending upon the current temperature of the oven, a load compensation factor programmed by the operator, and a base temperature set point.

More specifically, the present invention includes operating an oven with three programmed cooking intervals: brown, cook and finish. One cooking cycle consists of each of these three intervals, each interval being set for a period of 0 to 15 minutes in a preferred embodiment. However, while staying within the scope of the present invention, each interval could just as easily be longer than 15 minutes in length. The quartz heating element, preferably quartz bulbs, is located within the oven and may be programmed to be switched either on or off during each interval. For example, the quartz bulbs could be on briefly during the brown interval, off during the lengthier cook interval and on again briefly during the finish interval.

The above descriptions of the present invention provide only a broad overview of the preferred embodiments within the present invention. The details of certain aspects of the present invention will be more fully understood from the following specification and drawings.

BRIEF DESCRIPTION OF THE DRAWINGS

FIG. 4 shows a flow diagram of the operation of the timer interrupt handler.

DETAILED DESCRIPTION OF THE PREFERRED EMBODIMENT

The present invention preferably embodies a hardware controller which performs various functions on the oven. The hardware for the controller will first be described, with the functions and steps performed by the hardware described thereafter.

Hardware Description

Figure 1:
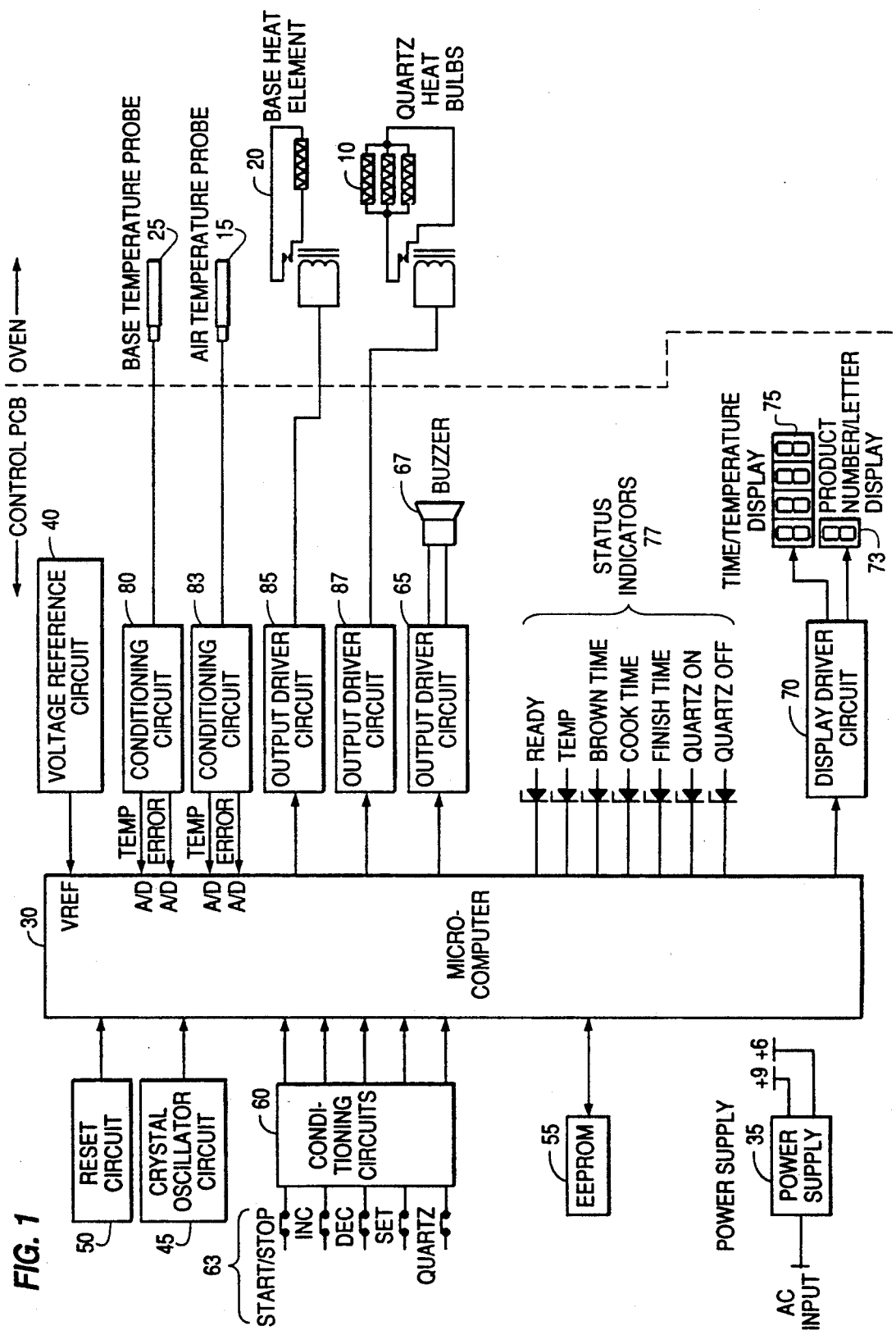
FIG. 1 shows a block diagram of the control hardware for the oven in the present invention.

Referring to FIG. 1, first and second heating elements 10 and 20 are disposed within an oven having a base and a cavity (not shown). The second heating element 20 is a base heating element located preferably underneath a base plate, the HTX TRANSITE II TM base by BNZ MATERIALS, INC. in a preferred embodiment. However, other base materials may be used such as metal, compressed asbestos, ceramics or other materials on which food may directly be placed and which are able to withstand oven temperatures. Base heating element 20 could be a gas heater or other heating means, but preferably is a 3200 watt CALROD electric heating element.

Located within the oven's cavity and above the base plate, preferably near the roof of the cavity, is the first heating element 10, preferably quartz heat bulbs. The quartz heat bulbs must be able to provide a higher thermal intensity for a relatively brief heating period as opposed to the base heating element 20. Base heating element 20 primarily preferably provides conducting heat whereas the first heating element preferably provides radiant heat.

Two temperature probes are provided within the oven to detect temperature within the cavity and base of the oven. Base temperature probe 25 is thus located within or proximate to the base while air temperature probe 15 is located within an air duct immediately outside the oven cavity. Base temperature probe 25 should be placed so as to receive approximately the mean temperature of the base. Similarly, air temperature probe 15 should be placed within the oven cavity, so that it may detect the mean temperature of the air within the oven cavity. Consequently, probes 15 and 25 should not be placed too far, nor too close to heating elements 10 and 20.

Microcomputer 30, which preferably includes a Motorola MC68705R3L microprocessor, provides computer control of the hardware, and specifically of the control board. This processor also includes a 4-channel, 8-bit A/D converter which is used to convert the temperature voltage signals from temperature probes 15 and 25 to digital values for computing and control. An internal non-volatile memory (ROM or PROM, or preferably EPROM) of microcomputer 30 stores the program code, as described in detail below. Microcomputer 30 also contains internal random access memory (RAM) which is used for calculation purposes.

Power supply 35, located mainly on the control board in a preferred embodiment, also includes an offboard transformer which converts an AC power input into a power compatible with the requirements of the control board and microcomputer 30. Capacitors are provided in power supply 35 to provide EMI/RFI filtering. Additionally, fuses and metal oxide varistors (MOV) are included to provide surge protection. Power supply 35 also preferably includes a diode bridge to fully rectify an AC input voltage into a DC voltage. Additionally, an integrated circuit voltage regulator, as is commonly available in the market, is provided. All of the above elements and construction for power supply 35 are well known in the art.

Reset circuit 50 coupled to microcomputer 30 preferably comprises a capacitor. Crystal oscillator circuit 45 forms a system clock oscillator comprised of preferably a capacitor and a crystal oscillator having a frequency of 4 megahertz. This results in an internal clock rate of 1 megahertz. Voltage reference circuit 40 establishes the reference voltages for the internal A/D converter.

EEPROM 55 is a non-volatile memory, preferably located on an integrated circuit capable of serial communications, for example, TS93C46. EEPROM 55 stores the product parameters: times, temperatures, quartz heating settings, and load compensation factors, all of which will be described in more detail below. Appropriate protection circuitry is preferably also connected with EEPROM 55 to insure that the contents of the non-volatile memory are not inadvertently changed during control power-up and power-down.

Microcomputer 30 also contains appropriate user inputs located on the exterior of the oven and outputs for display devices described below. Protection circuitry is provided to insure that noise does not generate false interrupts or corrupt control signal operation, as is well known to those in the art.

Conditioning circuit 60 provides preferably pulldown resistors which insure that switch input voltages from user input switches 63 do not float when the switches are open. Thus, circuit 60 results in preferably an output voltage of approximately 5 volts when a switch is closed, and approximately 0 volts when the switch is open.

LED status indicators 77 are provided to indicate the following states: ready, temperature, brown time, cook time, finish time, quartz bulbs on, quartz bulbs off. Signals from microcomputer 30 are coupled to LED status indicators 77. While the preferred embodiment utilizes LEDs, other indication means may be provided as is well known in the art.

Display driver circuit 70 is preferably an integrated circuit such as MC14489. The display driver circuit 70 preferably is a multiplexing driver circuit to drive time/temperature display 75 and product no./letter display 73. Displays 73 and 75 are preferably seven segments LED displays, but could be other indicating means as is well known in the art. Displays 73 and 75 and indicator 77 are preferably physically located on the control panel on the front panel of the oven. Seven segment display 75 can display both time, numbers and limited alphanumeric messages of up to four characters. Display 73 is used to display the current selected product number from 1 to 9 or a letter from A through F.

Buzzer 67 is preferably a piezoelectric buzzer having a main feedback and ground connection. The buzzer is used to provide audible feedback of various control operation conditions to the operator. Output driver circuit 65 preferably is a modified Hartley oscillator which drives buzzer 67 circuit near its resonant frequency for maximum efficiency in terms of sound level. Output driver circuit 65 preferably includes a switch or means to select a desired setting for the buzzer sound level. Associated driver circuitry is also included in driver circuit 65 as is well known in the art.

Temperature sensor conditioning circuits 80 and 83 are preferably identical signal conditioning circuits connected to base temperature probe 25 and air temperature probe 15, respectively. Conditioning circuits 80 and 83 also preferably include circuitry to determine probe failure in either "open" or "shorted" failure modes. Thus, two inputs, a temperature and error input, are provided from conditioning circuits 80 and 83 into the A/D inputs of microcomputer 30. Associated capacitors are provided in conditioning circuits 80 and 83 to provide for EMI and other noise filtering functions, as is well known in the art.

Output driver circuits 85 and 87 are preferably two identical output circuits for driving base heating element 20 and heating element 10, respectively. Driver circuits 85 and 87 preferably include OP- TOISOLATED triac driver integrated circuits such as MOC3041. Appropriate protection of circuitry is provided to prevent false power-up, as is well known in the art. Control signals are provided from microcomputer 30 into driver circuits 85 and 87 to turn on heating elements 20 and 10 at appropriate times, as will be discussed more fully below.

The present invention preferably also includes circuitry to provide for additional heating means should they be desired in the oven to provide even greater flexibility and control as the presently described embodiment. A fan fail circuit may also be provided to detect failure of the off-board cooling fan and thus warn an operator or shut down the system to prevent further damage.

Process Description

The overall operation of the process of the present invention in a preferred embodiment is depicted in the flow diagram of FIG. 2, and will now be described in some detail below. The process is executed on microcomputer 30 (shown in FIG. 1) and resides in the internal non-volatile memory of microcomputer 30 (not specifically shown in FIG. 1).

Figure 2:
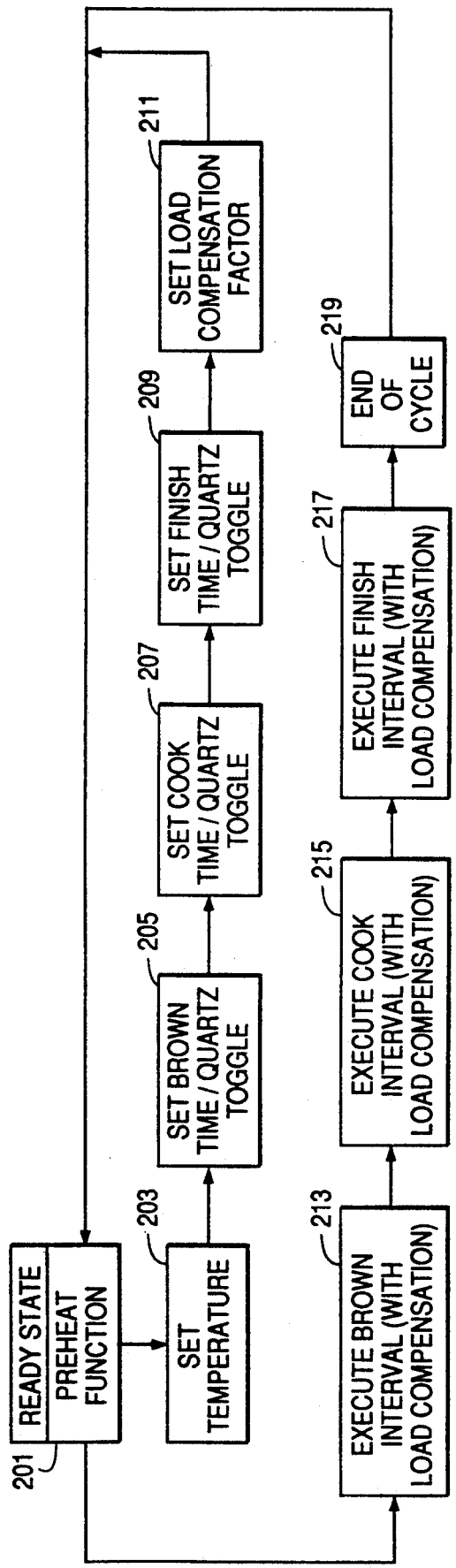
FIG. 2 shows a flow diagram detailing the operation of the present invention.

Referring to FIG. 2, the three aspects of the present invention are shown interacting with one another. Specifically, step 201, the ready state/preheat function is performed when the oven's operation is initially started, and is repeated as needed thereafter. This step generally consists, in part, of heating the base of the oven to a predetermined temperature by means of activating the base heating element 20 and thereafter heating the air in the oven's internal cavity to a predetermined temperature by means of heating element 10.

When a user of the present invention wishes to set the various parameters corresponding to the operation of the oven, he/she may press a "SET" switch (such as the "SET" switch of element 63 of FIG. 1). In a preferred embodiment, the software aspects of the present invention will thereafter prompt the user to enter the various parameters, examples of which are illustrated in steps 203–211. For example, in a preferred embodiment, the user may utilize the increment/decrement switches of the Peerless oven ("INC" and "DEC" switch of element 63 of FIG. 1) to modify the parameters in steps 203–211. In another embodiment, the user may simplify directly enter the desired parameters on a device such as a numeric keypad, etc.

Step 203 comprises setting the base set point temperature for the oven. This value represents the desired temperature of the base of the oven. This value is used during the preheat function (step 201), as well as the actual oven cooking intervals as described below with respect to steps 213–217.

Steps 205, 207, and 209 comprise selecting the time for the "brown", "cook" and "finish" intervals as well as selectively setting heating element 10 to either be on or off during each interval according to one embodiment of the present invention. The selected values are stored in memory. In a preferred embodiment, the operator may select a time duration between 0–15 minutes for each cooking interval, where the total cooking time is the sum of the selected cooking interval times. The time of each interval may be displayed on display 75. After the time for a particular interval is selected, the operator sets the heating element 10 to be on or off during that interval. A toggle switch may be provided to set heating element 10. The operator then selects the time for the next interval. However, the order in which the values are selected is not critical. For example, each of the interval times may be selected first, and then the heating element 10 may be set for the individual intervals. In addition, the structure used to select the interval times and to selectively set heating element 10 is not critical. One of skill in the art may recognize a variety of structures to accomplish these functions, including a numeric keyboard with an on/off button, individual buttons, dials, etc. In a preferred embodiment, LED status indicators prompt the operator to select a particular parameter.

The selected times and settings are stored within the control system of the present invention, and are thereafter utilized in steps 213–217 to determine the appropriate timing characteristics of the various cooking intervals and the operation of heating element 10. In a preferred embodiment, the first heating element 10 is set on during the brown interval, off during the cook interval, and on during the finish interval.

Figure 3A:
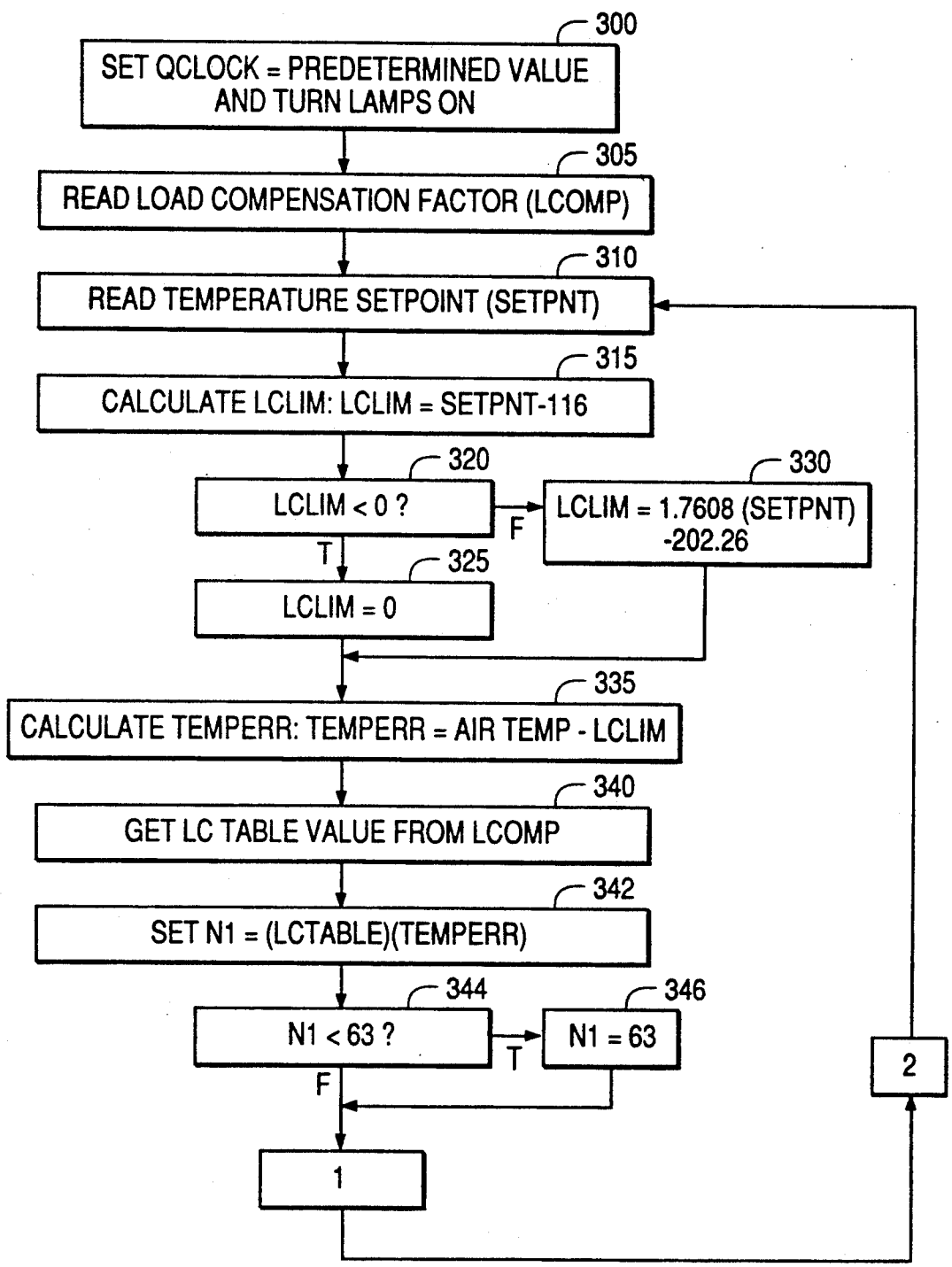
FIGS. 3A and 3B show a flow diagram detailing the operation of the load compensation.
Figure 3B:
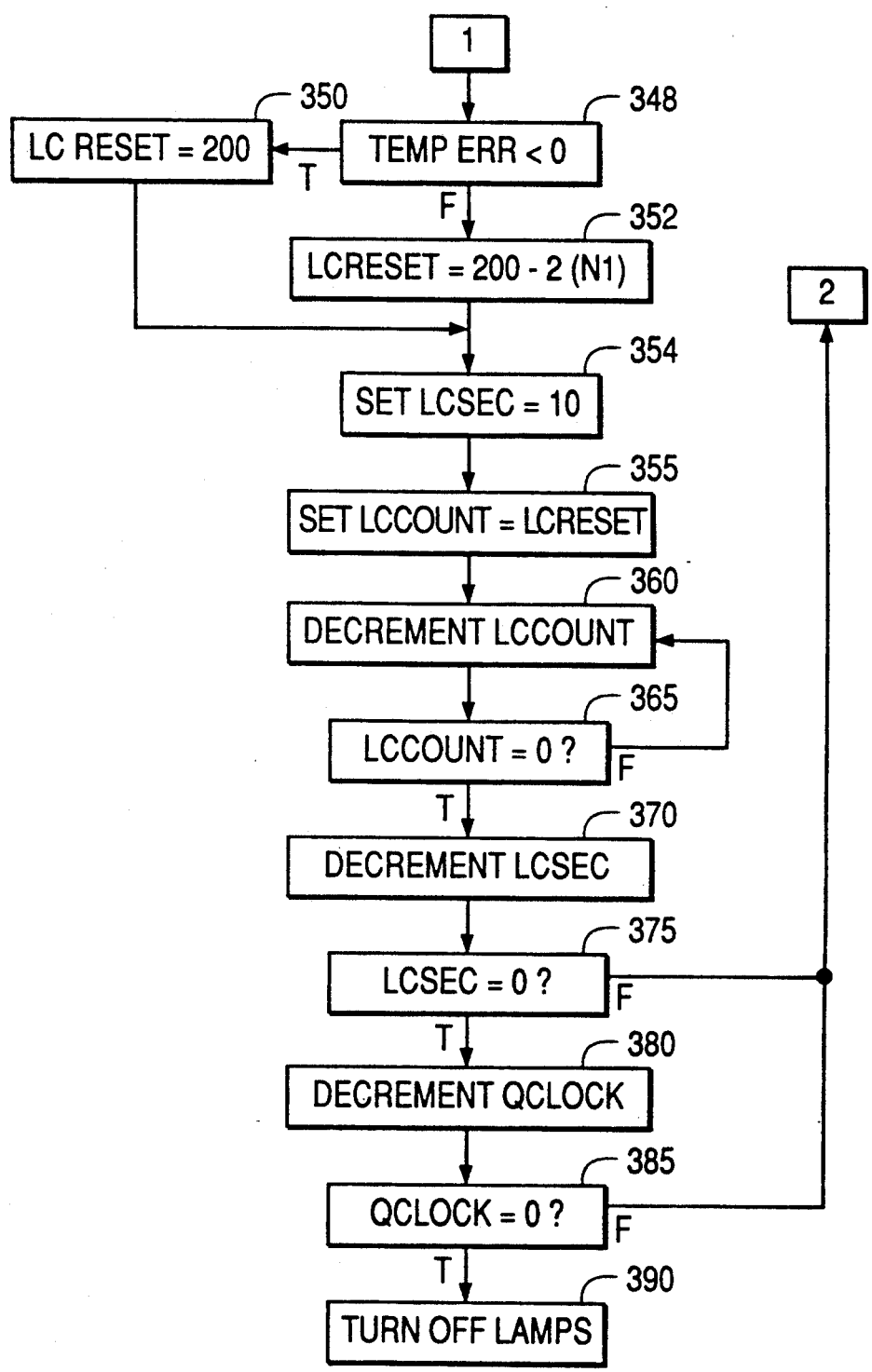

Step 211 involves setting a load compensation factor. The load compensation factor is utilized to account for the type of load being cooked within the oven. The load compensation factor is used by steps 213–215 in the preferred embodiment to compensate the timing characteristics of the various operating intervals as shown in FIGS. 3A, 3B, and 4 and as described in related application Ser. No. 07/746,910, filed Aug. 19, 1991. After the load compensation factor has been set, execution transfers back to the ready state/preheat function until the user requests another operation.

Steps 213, 215, and 217 involve executing the "brown", "cook" and "finish" intervals according to the preferred embodiment of the present invention. These steps are executed after the associated characteristics have been set in steps 203–211, and when the user selects, in a preferred embodiment, the "start" function by pressing the "Start/Stop" key ("START/STOP" switch of element 63 of FIG. 1). Steps 213, 215, and 217 utilize the corresponding temperature, times, load compensation factor, and heating element 10 settings selected in steps 203–211. Specifically, the temperature set in step 203 is maintained throughout these steps, the times for the various intervals are kept in conjunction with the load compensation factor, and the operational status of the quartz bulbs is maintained for each of the three intervals in the preferred embodiment. If the time of a particular interval is set to 0, that interval is skipped. Throughout the cooking cycle, status indicators 77 indicate the interval which is being executed.

Finally, step 219 corresponds to the end-of-cycle operation performed after the "brown", "cook" and "finish" intervals are completed. The operator may be alerted to the end of cycle state by buzzer 67 and/or displays 73 and 75. After step 219 has been reached, execution is transferred back to the ready state/preheat function of step 201.

We claim:

1. A method for operating a food oven having first and second heating elements comprising:
   (a) selecting a duration for each of a first, a second, and a third heating interval;
   (b) selectively setting said first heating element to be activated during any of the first, second, and third heating intervals;
   (c) activating said second heating element during each of the first, second, and third intervals;

(d) automatically activating said first heating element responsive to step (b); and (e) adjusting the duration of any said interval that said first heating element is selectively activated based upon at least one of an oven air temperature, a load compensation factor, and a base temperature set point.

2. The method according to claim 1, wherein said first heating element is a radiant heating element, and said second heating element is a conducting heating element.

3. The method according to claim 1, wherein step (a) comprises selecting a duration between 0 and 15 minutes for each of said first, second and third heating intervals.

4. The method according to claim 1, wherein step (e) comprises adjusting the duration that said first heating element is activated such that the adjusted duration does not exceed the selected duration of the interval.

5. The method according to claim 1, wherein step (b) comprises setting said first heating element to be activated during the first heating interval and the third heating interval.

6. The method according to claim 5, wherein said first heating interval corresponds to a brown interval, said second heating interval corresponds to a cook interval, and said third heating interval corresponds to a finish interval.

7. A method for operating a food oven having first and second heating elements comprising:

(a) selecting a duration for each of a plurality of heating intervals;

(b) selectively setting said first heating element to be activated during any of the plurality of heating intervals;

(c) activating said second heating element according to the selected durations for each of the plurality of intervals;

(d) automatically activating said first heating element responsive to step (b); and (e) adjusting the duration of any said interval that said first heating element is selectively activated based upon at least one of an oven air temperature, a load compensation factor, and a base temperature set point.

8. The method according to claim 7, wherein said first heating element is a radiant heating element, and said second heating element is a conducting heating element.

9. An oven for heating food comprising:

first and second heating elements for heating food;

means for selecting a duration for each of a first, a second, and a third heating interval;

means for selectively setting said first heating element to be activated during any of the first, second, and third heating intervals;

means for activating said second heating element during each of the first, second, and third intervals;

means, responsive to said means for setting, for automatically activating said first heating element; and means for adjusting the duration of any said interval that said first heating element is selectively activated based upon at least one of an oven air temperature, a load compensation factor, and a base temperature set point.

10. The oven according to claim 9, wherein said means for adjusting comprises means for adjusting the duration that said first heating element is activated such that the adjusted duration does not exceed the selected duration of the interval.

11. The oven according to claim 9, wherein said first heating element is a radiant heating element.

12. The oven according to claim 11, wherein said radiant heat element is a quartz bulb.

13. The oven according to claim 9, wherein said second heating element is a conducting heating element.

14. The oven according to claim 13, wherein said conducting heating element is an electrical heating element.

15. The oven according to claim 10, wherein said means for selectively setting said first heating element comprises a keypad.

16. In an oven for heating food comprising first and second heating elements, wherein the improvement comprises a control system including:

means for selecting a duration for each of a first, a second, and a third heating element;

means for selectively setting said first heating element to be activated during any of the first, second, and third heating intervals;

means for activating said second heating element during each of the first, second and third intervals;

means for automatically activating said first heating element in response to said setting means; and means for adjusting the duration of any said interval that said first heating element is selectively activated based upon at least one of an oven air temperature, a load compensation factor, and a base temperature set point.

17. A method for programming a food oven having first and second heating elements and for heating one or more items with a first and second heating element according to selected durations for each of a plurality of intervals, wherein said heating step includes the step of automatically activating said first heating element during an interval in which said first heating element is set, said method comprising:

selecting a duration for each of said plurality of heating intervals;

selectively setting said first heating element to be activated during any one of said plurality of heating intervals; and adjusting the duration of any said interval that said first heating element is selectively activated based upon at least one of an oven air temperature, a load compensation factor, and a base temperature set point.

* * * * *